UNITED STATES PATENT OFFICE.

CHARLES A. SEELY, OF NEW YORK, N. Y.

IMPROVEMENT IN THE MANUFACTURE OF EXTRACT OF HOPS.

Specification forming part of Letters Patent No. 103,091, dated May 17, 1870.

I, CHARLES A. SEELY, of the city, county, and State of New York, have invented a new and Improved Process for Extracting the Useful Substance of Hops and for Manufacturing a Pure and Concentrated Extract of Hops, of which the following is a specification:

My invention is based on the fact, of which I suppose myself to have been the first observer, that the ordinary petroleum oils are rapid and complete solvents of the essential oil and of the bitter matter of hops, while they have no solvent action on the other constituents of the plant, which in practical operations are either useless or harmful.

My process, in brief and in general terms, consists in bringing the hops in petroleum oil, and then, by heat, stirring, digesting, percolation, &c., promoting the solvent action of the oil. When, by such means, the extractible matter of the hops is dissolved, I separate, by filtration, the solution of hop-extract in oil from the refuse matter, and finally, by heat, I volatilize or distill off the solvent, and thus obtain the extract free from the solvent and other foreign matter.

The kinds of petroleum which I prefer and use are known commercially under the names "naphtha" and "gasoline," and are the lighter and more volatile part of crude Pennsylvania petroleum.

Although any petroleum oil which has a boiling-point below 212° Fahrenheit may be employed, I prefer a gasoline which boils at about 100° Fahrenheit, for the reason that at that temperature the essential oil of hops will not escape from the extract solution on distilling the solvent.

The apparatus which I employ in making the solution and distilling the solvent is such as is suitable and well known for use when bisulphide of carbon, ether, or alcohol is used for similar purposes.

My extract of hops, prepared as described, is of a pasty consistency, more or less thin, in proportion to the essential oil contained in it. It is soluble in water, but slowly and in only small quantity. In order to increase its solubility in water, and in order to give it a more convenient consistency for measuring, transferring, &c., I add to it sufficient alcohol to give it the consistency of thin sirup. This is probably the best form for a commercial extract of hops.

The petroleum oils suitable for my purpose are at the present abundant as natural products, and they may also be produced by artificial means, such as by the destructive distillation of the heavier hydrocarbons.

I desire it to be understood that my method includes the use of artificial as well as natural or native light hydrocarbons, which are solvents of the bitter substance and of the oil of hops.

I claim as my invention—

1. The use of hydrocarbons, in the manner and for the purpose described.

2. The extract of hops, when prepared as herein described.

3. The mixture of alcohol and extract of hops, as herein set forth.

CHARLES A. SEELY.

Witnesses:
JAMES S. GRINNELL,
NEWTON CRAWFORD.